United States Patent
Wu

(10) Patent No.: US 7,461,668 B2
(45) Date of Patent: Dec. 9, 2008

(54) PARTY-TENT WITH AN ILLUMINATING DEVICE

(76) Inventor: Weidan Wu, Yada Technology Group, Fengkeng Industrial Zone, Sanmen County, Zhejiang Province (CN) 317100

( * ) Notice: Subject to any disclaimer, the term of this patent is extended or adjusted under 35 U.S.C. 154(b) by 207 days.

(21) Appl. No.: 11/421,129

(22) Filed: May 31, 2006

(65) Prior Publication Data

US 2006/0272692 A1      Dec. 7, 2006

(30) Foreign Application Priority Data

Jun. 3, 2005    (CH)    ................. 2005 2 0102653 U

(51) Int. Cl.
*E04H 15/10*    (2006.01)
(52) U.S. Cl. ................................................ 135/91
(58) Field of Classification Search .............. 135/91
See application file for complete search history.

(56) References Cited

U.S. PATENT DOCUMENTS 6,745,521 B1 *   6/2004   Klemming ................. 52/79.6

2004/0031510 A1 *   2/2004   Li ................................ 135/21
2004/0228118 A1 *   11/2004   Peterson .................... 362/102

\* cited by examiner

*Primary Examiner*—David R Dunn
*Assistant Examiner*—Danielle Jackson
(74) *Attorney, Agent, or Firm*—Global IP Services; Tianhua Gu

(57) ABSTRACT

A party-tent with an illuminating device for providing outdoor leisure use at night comprises one roof assembly including one top positioned first multi-directional angle-joint 1, a plurality of inclined bars 14 and a plurality of transverse bars 13, the inclined bar 14, one end connects to a first multi-directional angle-joint 1, and other end to a second multi-directional angle-Joint 2; a plurality of second multi-directional angle-Joints 2 are horizontally arranged at each corner of the tent; a plurality of surrounding walls each formed by two adjacent upright corner members 3, each upright corner member 3 of the surrounding walls being formed by two crossed erect panels, the erect panel is a prefabricated, which is constructed by first erect pole 11 and second erect pole 15, and having a plurality of lateral short bars 12 connected there between; a plurality of inclined bars 14 having plurality of light bulbs thereon, which are energized by top positioned solar energy power supply unit.

3 Claims, 4 Drawing Sheets

PARTY-TENT WITH AN ILLUMINATING DEVICE

CROSS REFERENCE TO THE RELATED PATENT APPLICATION

This patent application claims the priority benefit of the Chinese patent application No. 200520102653.7, filed on Jun. 3, 2005.

BACKGROUND OF THE INVENTION

Field of the Invention

The present invention relates to a party-tent with an illuminating device for providing outdoor leisure use at night.

Leisure sites such as plazas, beaches or lawns are generally installed with standing tent to provide sunshade places. A conventional party-tent is widely used because it easy to pitch, having a large space under which people can do leisure activities and play games, but such leisure sites is remote-located to house, it is hard to provide alternative electricity to the tent for illumination at night. And a long extended wiring connected to an indoor socket or a generator is required. However, use of the generator and long-extended wiring to supply electricity is troublesome.

In order to accommodate sufficient people gathering in, an enough large inner space is needed. The shape of tent is preferably variable according user's desire, it is hoped that we have the choice of the tent shape between triangular, rectangular, pentagon, or hexahedral and the size thereof, it is pitched with standard fabricate components.

SUMMARY OF THE INVENTION

It is a general object of present invention to provide a night-illuminable party tent, which needs not a long distance electric connection and has a self-contained power supply unit.

The further object of the present invention is to provide easy changeable shape or size of tent according the user's desire. The tent is portable, pitch-able, and collapsible temporally at leisure sites and using prefabricated elements to form tent having a shape selected from triangular, rectangular, pentagon, or hexahedral party-tent.

In accordance with one aspect of the invention the party-tent includes a roof assembly and a plurality of surrounding walls erecting on the ground. Various party-tent with different shape includes one roof member, and plurality of corner members constituting its surrounding walls. The number of corner member is corresponding to the number of corner of the tent, and also the number of erect surrounding wall, for example, a triangular shaped tent has 3 corner members, a rectangular shaped tent has 4 corner members, and a hexahedral party-tent accordingly has 6 corner members.

The roof assembly includes a top positioned first multi-directional angle-joint, plurality of inclined bars and plurality of transverse bars. The inclined bar connects to a first multi-directional angle-joint at their upper end through one-touch plug-in releasable connection, connects to a second multi-directional angle-Joint at the lower end of the inclined bar, a plurality of second multi-directional angle-Joints are horizontally arranged at each corner of the tent through one-touch plug-in connection joint. The second multi-directional angle-Joints has a tubular construction in which two transverse joints are arranged in a horizontal plane to meet transverse bars accommodating therein and an inclined joint upwards to meet a inclined bar accommodating therein.

The surrounding wall formed by two adjacent upright corner members. Each upright corner member of the surrounding walls is formed by two crossed erect panels through traditional one-touch plug-in connection. Each erect panel is prefabricated, which is constructed by first erect pole and second erect pole, and have plurality of lateral short bars connected there between through traditional tenor jointing connection. The second multi-direction angle-joint is a connection member for jointing roof assembly with the surrounding walls by plug-in connection.

In accordance with another aspect of the invention, a plurality of illumination members are disposed along the plurality of inclined bars by plug-in manner. All lights mounted on the inclined bar are energized from a battery through a switch. The power supply unit includes solar panel, battery, socket, and fastener. The battery preferably is a ground-rested battery. The fastener has a male-screw connector on its bottom surface for coupling with the first multi-directional angle-joint, which preferably has a horizontally arranged plane on its top place for mounting a main illuminating member.

The illuminating device in accordance with the present invention includes at least one light unit mounted on one or more of the inclined bar. A solar energy panel mounted on the top of party-tent for receiving solar energy and transforming solar energy into electricity for providing electricity to plurality of light bulbs mounted on each inclined bar or on the downwards inner-surface of the first multi-directional angle-joint. All inclined bars are electrically connected with one another. And at least one light bulb is mounted on at least one of the inclined bar. The light unit is electrically connected to the solar energy assembly with battery. Preferably there is a main lighting member disposed at the central position of the tent underneath the inner-surface of the first multi-directional angle-joint.

Each inclined bar has a section which includes a first chamber located in upper part and a second chamber located in lower part. The first chamber is an upward opened long slot. The second chamber is a long slot inside the inclined bar, there is a partition between first chamber and second chamber. Each light bulb is releasable to be mounted on the bottom surface of the inclined bar by penetrating bottom surface of the second chamber and the partition between the first chamber and the second chamber.

In the first chamber of the inclined bar there is a fastener which is a long-thin plastic strip covering over the cables. The fastener prevents the cables from escaping from the slot of chamber. The fastener strip is resiliently and releasable to be placed in the chamber between two adjacent light bulbs. That means one inclined bar may have many fastener strips in its first chambers. The connection of socket and light bulb may be screwing.

The object and advantages are more apparent from the following description with respect to the appended drawings. To the extent various modifications and improvements have been considered, they are described as appropriate. The description should not be literally construed in limitation of the invention.

DETAILED DESCRIPTION OF THE PREFERRED EMBODIMENT

The present invention comprises a party-tent for outdoor use, which includes a self-contained luminary for the use of leisure activities in the night in lawn, sea beach, and garden. The battery pack and associated solar panel is sufficient to allow the system to operate continuously for a time interval of several hours underneath the tent without the need of an external power source or an electric generator as power supply unit.

Figure 1:
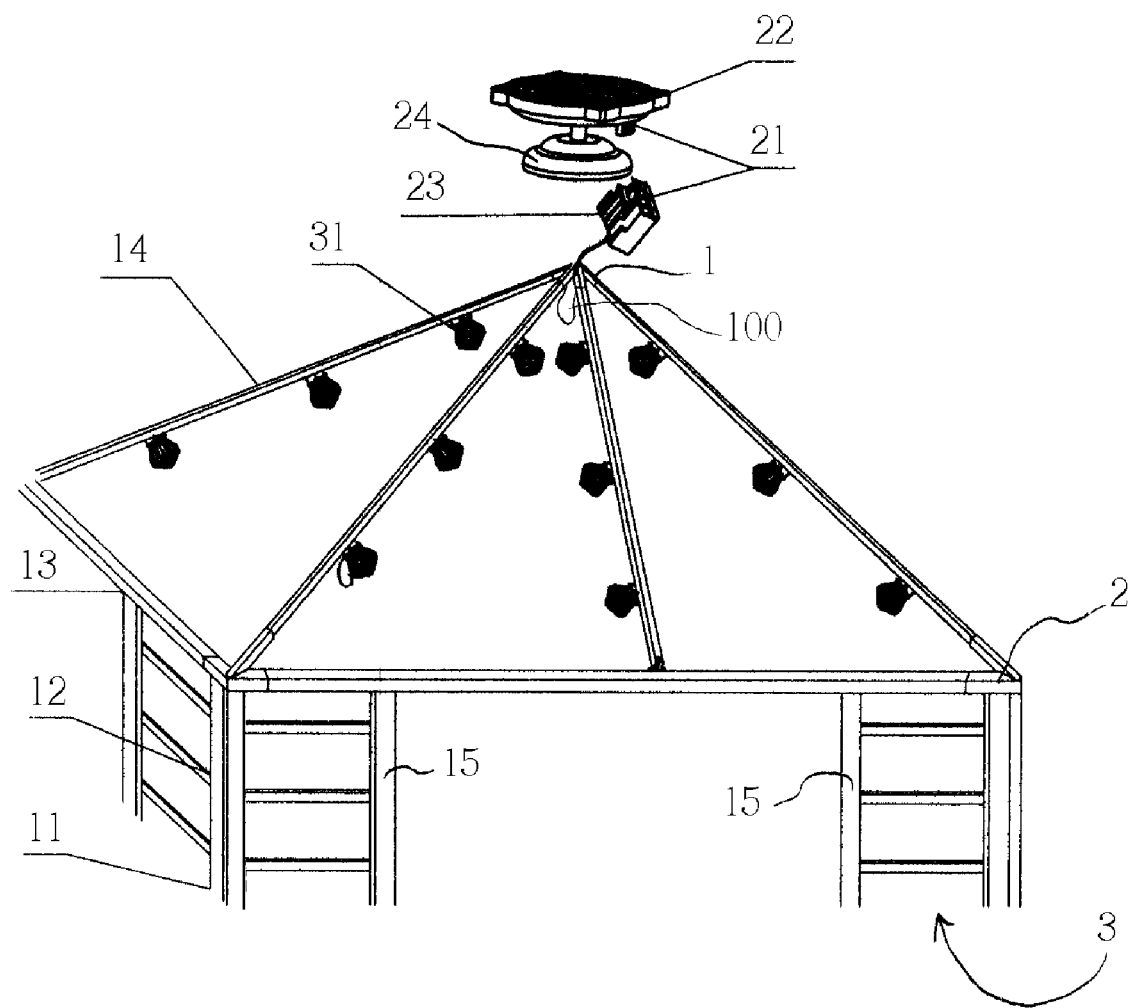
FIG. 1 is a perspective drawing of the embodiment tent of the present invention, which mainly showing the up-half part of the party-tent with illumination devices.
Figure 2:
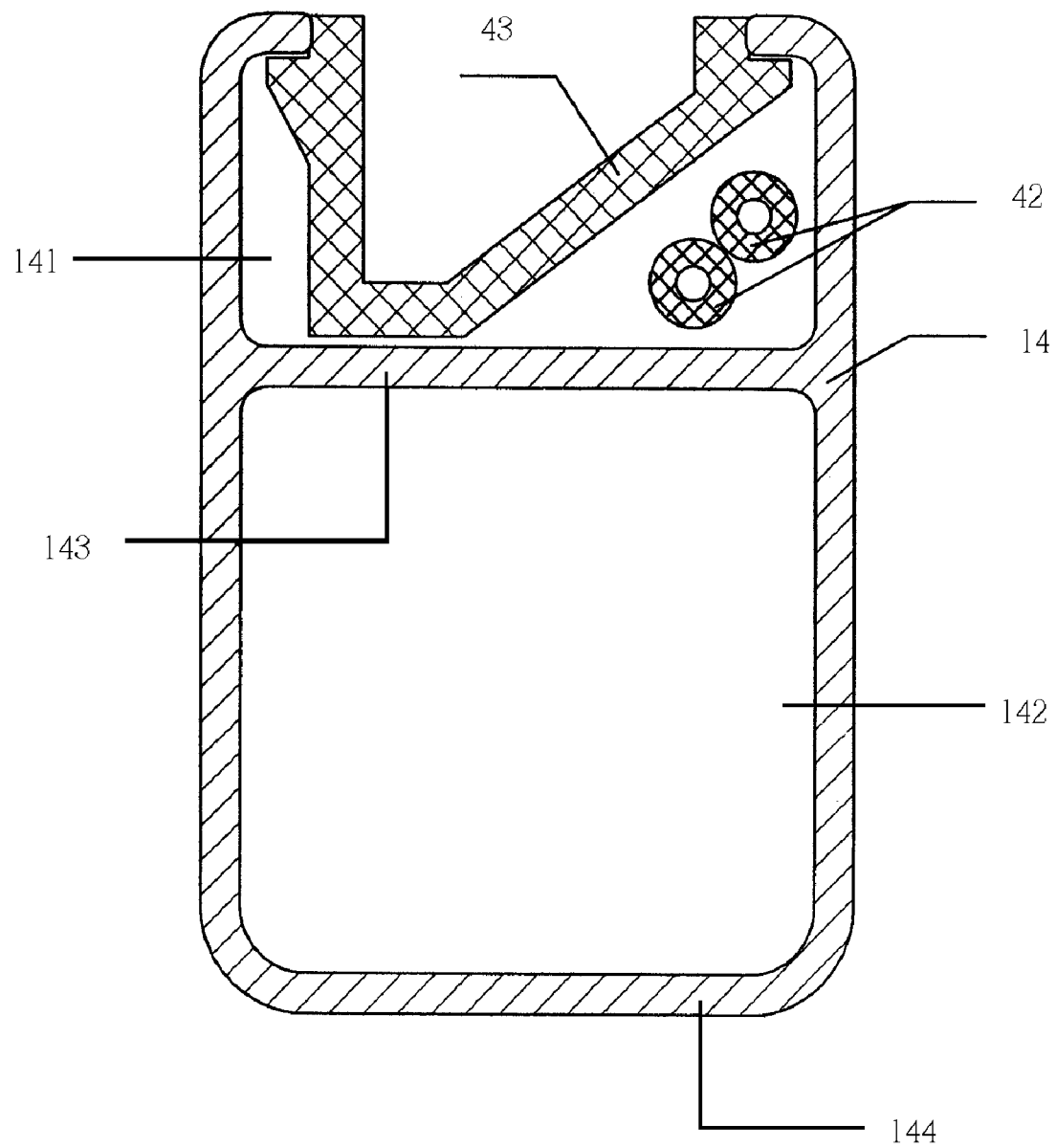
FIG. 2 is a cross section view of the inclined bar showing the sectional construction reflecting its first chamber accommodating electrical cables therein.
Figure 3:
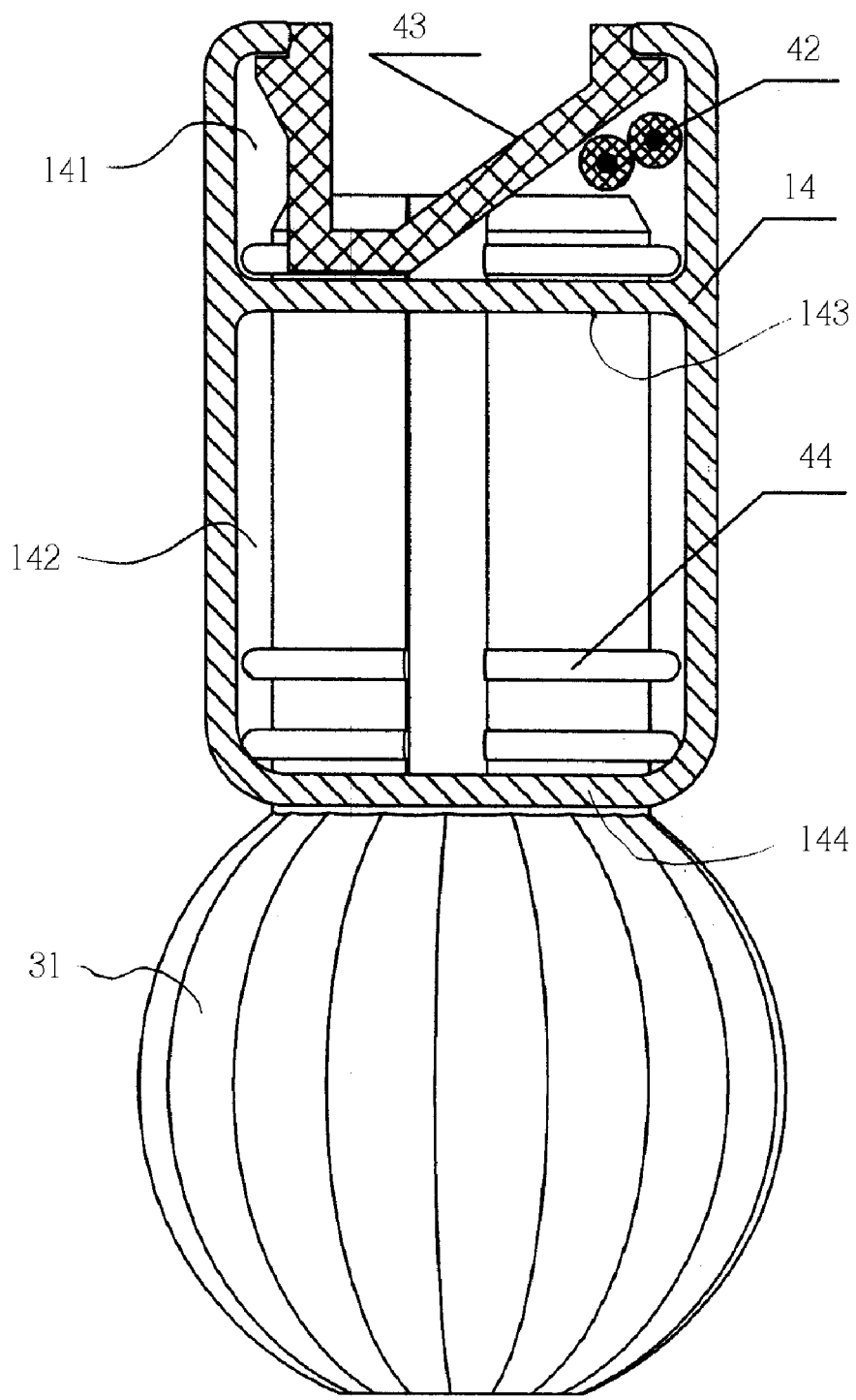
FIG. 3 is another cross section view of the inclined bar showing the sectional construction with electric cable, fastener strip and lighting bulbs thereon.

FIG. 1 of the drawings provides a perspective view, showing a party-tent with illumination devices, it includes a roof assembly and surrounding wall part thereof.

The roof assembly includes one top positioned first multi-directional angle-joint 1, plurality of inclined bars 14 and plurality of transverse bars 13. The inclined bar 14 connects to a first multi-directional angle-joint 1 at their upper end through one-touch plug-in releasable connection, at the lower end thereof the inclined bar 14 is connects to a second multi-directional angle-Joint 2, a plurality of second multi-directional angle-Joints 2 are horizontally arranged at each corner of the tent through one-touch plug-in connection.

Figure 5:
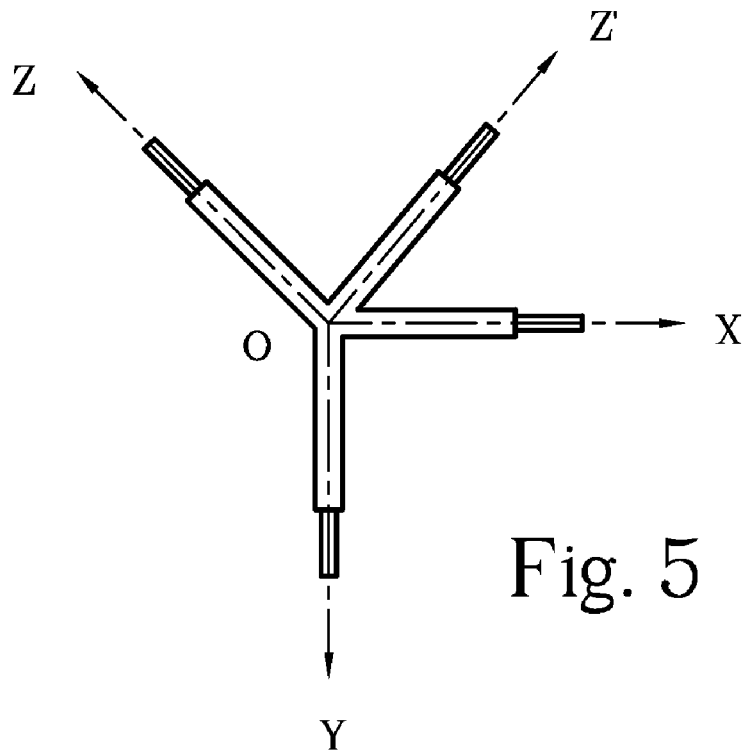
FIG. 5 is a perspective drawing of the second multi-directional angle-Joints.
Figure 6:
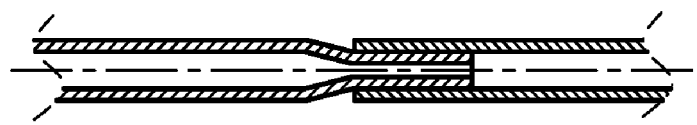
FIG. 6 is a cross section drawing showing an embodiment of the one-touch plug-in releasable connection.

Refer to FIG. 5, the second multi-directional angle-Joints 2 is a tubular claw configuration in which there are two horizontal tubes for accommodating two transverse bars 13 arranged in a horizontal plane and one inclined tube bars 14 accommodated in an inclined tube of the tubular claw and one downwards tube of the claw for release-ably connected to the top end of an upright pole 11 standing on the ground. This is a four-direct angle-joint, plays the role of joining roof assembly with surrounding walls together to form into a tent.

The surrounding wall formed by two adjacent upright corner members 3. Each upright corner member 3 of the surrounding walls is formed by two crossed erect panels through traditional one-touch plug-in connection. Each erect panel is a prefabricated one, which is constructed by first erect pole 11 and second erect pole 15, and have plurality of lateral short bars 12 connected there between through traditional connection or tenon jointing connection.

Figure 4:
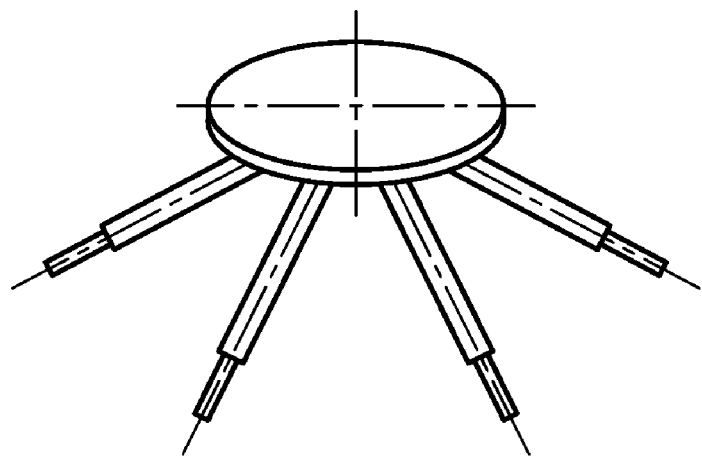
FIG. 4 is a perspective drawing of the first multi-directional angle-joint.

In accordance with another aspect of the invention, a plurality of light bulbs 31 are disposed along the plurality of inclined bars 14 by plug-in manner. All lights mounted on the inclined bar 14 is energized from a battery 23 through a switch. The power supply unit includes solar panel 22, battery 23, socket 21, and fastener 24. The battery preferably is a ground-rested battery. The fastener 24 has a male-screw connector (not shown) on its bottom surface for coupling with the top position of the first multi-directional angle-joint 1 which preferably has a horizontally arranged plane (see FIG. 4) on its top place for mounting a main illuminating member.

The illuminating device in accordance with the present invention includes plurality of light bulbs 31 mounted on one or more of the inclined bar 14. A solar energy panel 22 mounted on top of party-tent for receiving solar energy and transforming solar energy into electricity for providing electricity to plurality of light bulbs 31 mounted on each inclined bar 14 or a main light member 100 on the downwards inner-surface of the first multi-directional angle-joint 1. All inclined bars 14 are electrically connected with one another. A plurality of light bulbs 31 are mounted on the inclined bar 14. The light unit 31 is electrically connected to the solar energy assembly with battery 23. Preferably the battery 23 is placed resting on the surface of ground.

Each inclined bar 14 has a section, which includes a first chamber 141 located in upper part and a second chamber 142 located in lower part thereof. The first chamber 141 is an upward opened long slot. The second chamber 142 is a long slot inside the inclined bar 14, there is a partition 143 between first chamber 141 and second chamber 142. Each light bulb 31 is releasable to be mounted on the bottom surface 144 of the inclined bar 14 by penetrating bottom surface 144 of the second chamber 142 and the partition 143 between the first chamber 141 and the second chamber 142.

In the first chamber 141 of the inclined bar 14 there is a fastener 43 which is a long-thin plastic strip covering over the cables 42. The fastener 43 prevents the cables 42 from escaping from the slot of chamber 141. The fastener 43 is releasable to be placed in the chamber 141 between two adjacent light bulbs 31. It means that one inclined bar 14 may have many sections of fastener 43 in the cavity of first chambers 141. The connection of socket 44 and light bulb 31 may be screwing.

It gives a luminary for the use of playing games and doing leisure activities in the leisure sites such as plazas, beaches or lawns in night. The battery pack and associated solar panel is sufficient to allow the system to operate continuously for a time interval of several hours underneath the party-tent without the need of an external power source.

The advantages of present invention lies in that the tent can be easily collapsed with simple one-touch operation, the appearance of tent is esthetical due to the electric wiring cables being hidden inside the long slot of the inclined bar 14 and the safety is apparent due to without using long-extending electric wiring or electric generator to supply the electricity to the lighting.

What is claimed is:

1. A party-tent with an illuminating device comprising:
a) a roof assembly including a top positioned first multi-directional angle-joint, a plurality of inclined bars and a plurality of transverse bars, each of the plurality of inclined bars connects to the first multi-directional angle-joint at the upper end thereof through one-touch plug-in releasable connection, each of the plurality of inclined bars connects to a second multi-directional angle-Joint at the lower end thereof, a plurality of the second multi-directional angle-Joints, which are horizontally arranged at each corner of the tent through one-touch plug-in connection;
b) a plurality of surrounding walls each formed by two adjacent upright corner members, which is formed by two crossed erect panels through one-touch plug-in connection, the erect panel is a prefabricated, which is constructed by a first erect pole and a second erect pole, and having a plurality of lateral short bars connected there between;
c) the second multi-directional angle-Joints is a tubular claw configuration, in which there are two horizontal tubes for accommodating the transverse bars arranged in a horizontal plane and one inclined tube accommodating the inclined bar of roof assembly, and one downwards tube of the claw for connecting to the top end of the upright pole standing on the ground;

d) the plurality of inclined bars are electrically connected with each other, a plurality of light bulbs are mounted on the plurality of inclined bars, which energized by a power supply unit;

e) each of the plurality of inclined bars has a section, which includes a first chamber located in upper part for receiving electric cables and a second chamber located in lower part thereof, the first chamber is an upward opened long slot, the second chamber is a long slot inside each of the plurality of inclined bars, there is a partition between the first chamber and the second chamber, a plurality of sockets are mounted on the bottom surface of each of the plurality of inclined bars, the socket penetrates the partition between the first chamber and the second chamber, the light bulbs are releasable to be mounted in the sockets, a plurality of cable-fasteners which are a long-thin plastic strip cover over the cables, the fasteners are removable to be placed in the first chamber between two adjacent light bulbs.

2. The tent of claim 1, wherein the power supply unit includes a solar panel and a battery.

3. The tent of claim 1, wherein the battery is located on ground.

* * * * *